(12) United States Patent
Morodomi

(10) Patent No.: US 11,692,656 B2
(45) Date of Patent: Jul. 4, 2023

(54) PIPE JOINT

(71) Applicant: SMC CORPORATION, Chiyoda-ku (JP)

(72) Inventor: Yoichi Morodomi, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 407 days.

(21) Appl. No.: 17/052,972

(22) PCT Filed: Apr. 19, 2019

(86) PCT No.: PCT/JP2019/016729
§ 371 (c)(1),
(2) Date: Nov. 4, 2020

(87) PCT Pub. No.: WO2019/220857
PCT Pub. Date: Nov. 21, 2019

(65) Prior Publication Data
US 2021/0254767 A1    Aug. 19, 2021

(30) Foreign Application Priority Data
May 14, 2018    (JP) .................. 2018-093217

(51) Int. Cl.
*F16L 37/091*    (2006.01)
*F16L 37/12*    (2006.01)
(52) U.S. Cl.
CPC ....... *F16L 37/0915* (2016.05); *F16L 37/1225* (2013.01); *F16L 2201/10* (2013.01)

(58) Field of Classification Search
None
See application file for complete search history.

(56) References Cited

U.S. PATENT DOCUMENTS

| 6,312,019 | B1 * | 11/2001 | Nakazumi ........... F16L 37/0915 285/308 |
| 9,556,991 | B2 * | 1/2017 | Furuya ................. F16L 41/007 |
| 9,689,520 | B2 * | 6/2017 | Taneya ................. F15B 21/003 |
| 9,829,135 | B2 * | 11/2017 | Hanne ................. F16L 37/0927 |
| 2005/0236052 | A1 | 10/2005 | Miyazoe et al. |
| 2009/0033090 | A1 * | 2/2009 | Stoll ................... F16L 37/0985 285/317 |
| 2011/0062704 | A1 * | 3/2011 | Muto .................. F16L 37/0915 285/308 |

(Continued)

FOREIGN PATENT DOCUMENTS

| JP | 11-125354 A | 5/1999 |
| JP | 2005-308122 A | 11/2005 |

(Continued)

*Primary Examiner* — Aaron M Dunwoody
(74) *Attorney, Agent, or Firm* — Oblon, McClelland, Maier & Neustadt, L.L.P.

(57) ABSTRACT

A joint body has tube connection holes each having an inner circumferential surface including a plurality of contact walls, which are equiangularly spaced about an axis of the tube connection hole and extend along the axis. A joint guide is cylindrical and includes a barb on its outer circumferential surface. The joint guide is configured such that, when the joint guide is press-fitted into the tube connection hole, the outer circumferential surface of the joint guide comes into contact with inner wall surfaces of the contact walls and the barb catches the contact walls.

9 Claims, 10 Drawing Sheets

(56) References Cited

U.S. PATENT DOCUMENTS

| | | | | |
|---|---|---|---|---|
| 2011/0068573 A1* | 3/2011 | Muto | ............ | F16L 37/0842 285/313 |
| 2012/0217742 A1* | 8/2012 | Furuya | ............ | F16L 37/0915 285/345 |
| 2014/0183858 A1* | 7/2014 | Hanne | ............ | F16L 37/091 285/308 |
| 2015/0145249 A1* | 5/2015 | Taneya | ............ | F16D 48/02 285/340 |
| 2015/0159799 A1 | 6/2015 | Taneya et al. | | |

FOREIGN PATENT DOCUMENTS

| | | |
|---|---|---|
| JP | 2011-106596 A | 6/2011 |
| JP | 2013-167303 A | 8/2013 |
| JP | 2014-129828 A | 7/2014 |
| WO | WO 2014/010452 A1 | 1/2014 |
| WO | WO 2014/010453 A1 | 1/2014 |

\* cited by examiner

PIPE JOINT

TECHNICAL FIELD

The present invention relates to pipe joints, and in particular, relates to a pipe joint for a hydraulic device.

BACKGROUND ART

Pipe joints to be attached to hydraulic devices, such as a solenoid valve and a hydraulic cylinder, are known as disclosed in PTL 1 and PTL 2, for example.

This type of pipe joint typically includes a synthetic resin joint body that is to be attached to the hydraulic device and that has a circular tube connection hole for connection of a piping tube, a metal retaining ring to retain an outer circumferential surface of the tube placed in the tube connection hole and fasten the tube in the tube connection hole, a release member to release the retaining ring to stop retaining the tube, a cylindrical metal joint guide to guide the release member, and a packing to seal between an inner circumferential surface of the tube connection hole and the outer circumferential surface of the tube such that the tube connection hole receives the retaining ring, the release member, the joint guide, and the packing.

The joint guide is attached to the tube connection hole in a press-fitted manner. The joint guide has, on its outer circumferential surface, an annular barb (catch) to catch the inner circumferential surface of the tube connection hole in order to prevent disconnection of the joint guide from the hole. The barb has an outside diameter slightly greater than an inside diameter of the tube connection hole. Accordingly, the joint guide provides a very large resistance to press-fitting insertion when press-fitted into the tube connection hole. It is therefore difficult to attach the joint guide. In particular, the joint body made of a brittle synthetic resin, such as a synthetic resin containing glass fiber, may crack and fail to be attached because such a joint body is difficult to deform such that the tube connection hole is enlarged.

CITATION LIST

Patent Literature

PTL 1: International Publication No. WO 2014/010453
PTL 2: Japanese Unexamined Patent Application Publication No. 11-125354

SUMMARY OF INVENTION

Technical Problem

A technical problem of the present invention is to provide a pipe joint that includes a synthetic resin joint body having a tube connection hole receiving a retaining ring to retain a tube, a release member to release the retaining ring to stop retaining, and a metal joint guide to guide the release member and that achieves more ready and reliable press-fit attachment of the joint guide to the tube connection hole than in the related art.

Solution to Problem

To solve the above-described problem, the present invention provides a pipe joint including a joint body having a tube connection hole receiving a retaining ring that is to retain an outer circumferential surface of a tube placed in the tube connection hole, a cylindrical release member that is to release the retaining ring to stop retaining, a cylindrical metal joint guide that guides the release member, and a packing that is to seal between an inner circumferential surface of the tube connection hole and the outer circumferential surface of the tube. The joint guide includes on an outer circumferential surface thereof a barb that prevents disconnection, and is press-fitted in the tube connection hole. The inner circumferential surface of the tube connection hole includes a plurality of contact walls each having an inner wall surface in contact with the outer circumferential surface of the joint guide, the contact walls are equiangularly spaced about an axis of the tube connection hole and extend along the axis, and the barb catches the contact walls.

In the present invention, preferably, the tube connection hole includes a noncircular first hole portion having the contact walls and a circular second hole portion continuously extending from the first hole portion, the first hole portion has a length along the axis that is less than that of the joint guide and that is greater than a distance from a proximal end of the joint guide to the barb, the joint guide is press-fitted in the tube connection hole such that a distal end of the joint guide is fitted in the second hole portion and the barb is fitted in the first hole portion, and the packing is received in the second hole portion.

In this case, preferably, an imaginary cylindrical surface located inside and in contact with each of the contact walls has a diameter equal to that of the second hole portion. The inner wall surfaces of the contact walls may be flat surfaces that touch the imaginary cylindrical surface or may be concave surfaces that correspond to parts of the imaginary cylindrical surface.

In the present invention, preferably, a recess is provided between the contact walls that are adjacent, the recess serves as a relief that keeps the barb from catching a portion other than the contact walls and also serves as a relief that allows the joint guide to be deformed at a portion other than the inner wall surfaces when experiencing a force applied by the contact walls, and the contact walls are four contact walls spaced at 90-degree intervals.

In an embodiment of the present invention, the joint body includes a cylindrical portion having a diameter greater than a width of the joint body, and the cylindrical portion has therein the tube connection hole. The cylindrical portion has flattened parts located on diametrically opposite sides, the flattened parts provide flat faces such that the sides are flush with sides of the joint body, and each of the flattened parts is located between two adjacent contact walls.

The present invention further provides a solenoid valve with the pipe joint including the cylindrical portion having the flattened parts on the sides. The solenoid valve includes a main valve section including a valve mechanism that switches between passages and a solenoid operation section that drives the valve mechanism. The main valve section includes a rectangular cuboid valve body having therein the valve mechanism, the valve body has a width equal to that of the joint body, and the joint body is attached to a port formation surface of the valve body.

Advantageous Effects of Invention

According to the present invention, the joint guide is press-fitted into the tube connection hole while being in contact with the contact walls. A resistance to press-fitting in this case is significantly less than that in a case where the joint guide is press-fitted into the tube connection hole while the entire outer circumferential surface of the joint guide is being in contact with the entire inner circumferential surface of the tube connection hole. This facilitates smooth press-fitting of the joint guide.

Furthermore, while the joint guide is being press-fitted, a force applied to the walls of the tube connection hole by the joint guide is absorbed mainly by compression of the contact walls. In addition, a force applied to the joint guide by the contact walls is absorbed by slight outward deformation of the joint guide at positions between the adjacent contact walls. Such a synergy between these force absorption effects reduces a likelihood of deformation of the joint body. Therefore, if the joint body is made of glass-fiber-containing synthetic resin, which is rigid and susceptible to stretching, the joint body is less prone to cracking due to deformation.

DESCRIPTION OF EMBODIMENTS

Figure 1:
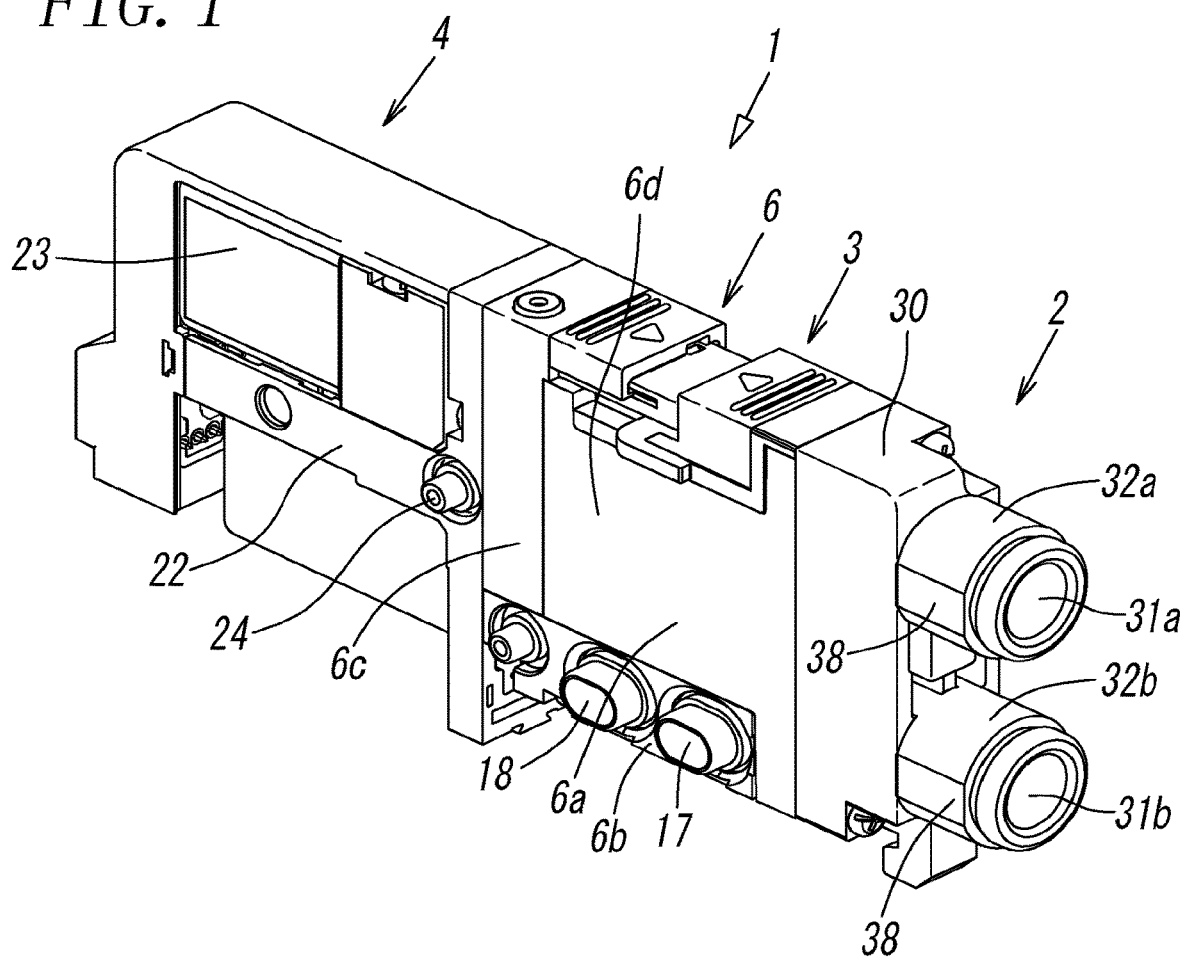
FIG. 1 is a perspective view of a solenoid valve with a pipe joint according to a first embodiment attached thereto.
Figure 2:
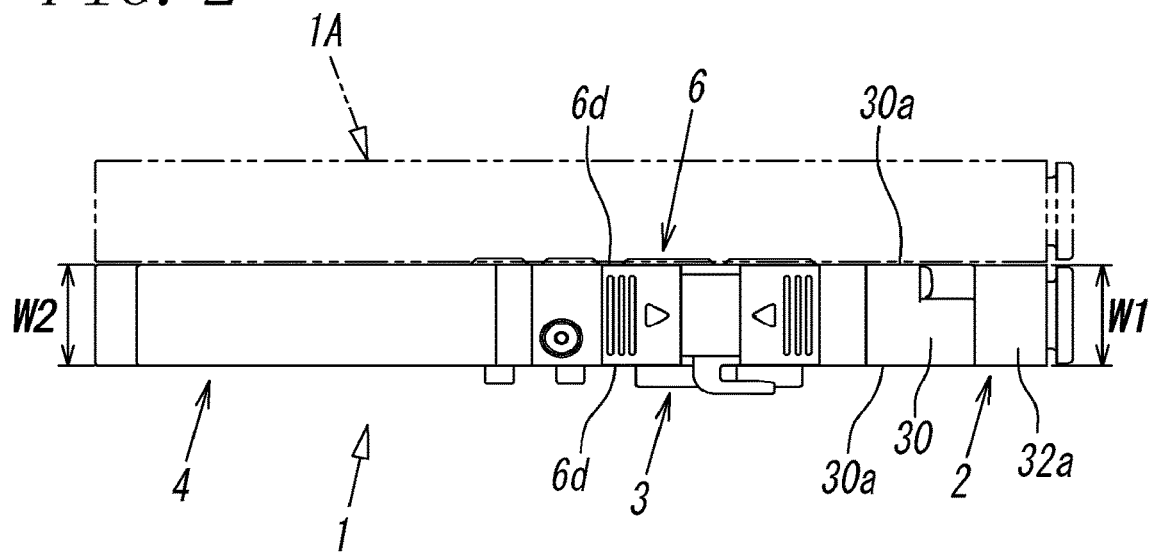
FIG. 2 is a plan view of FIG. 1.
Figure 3:
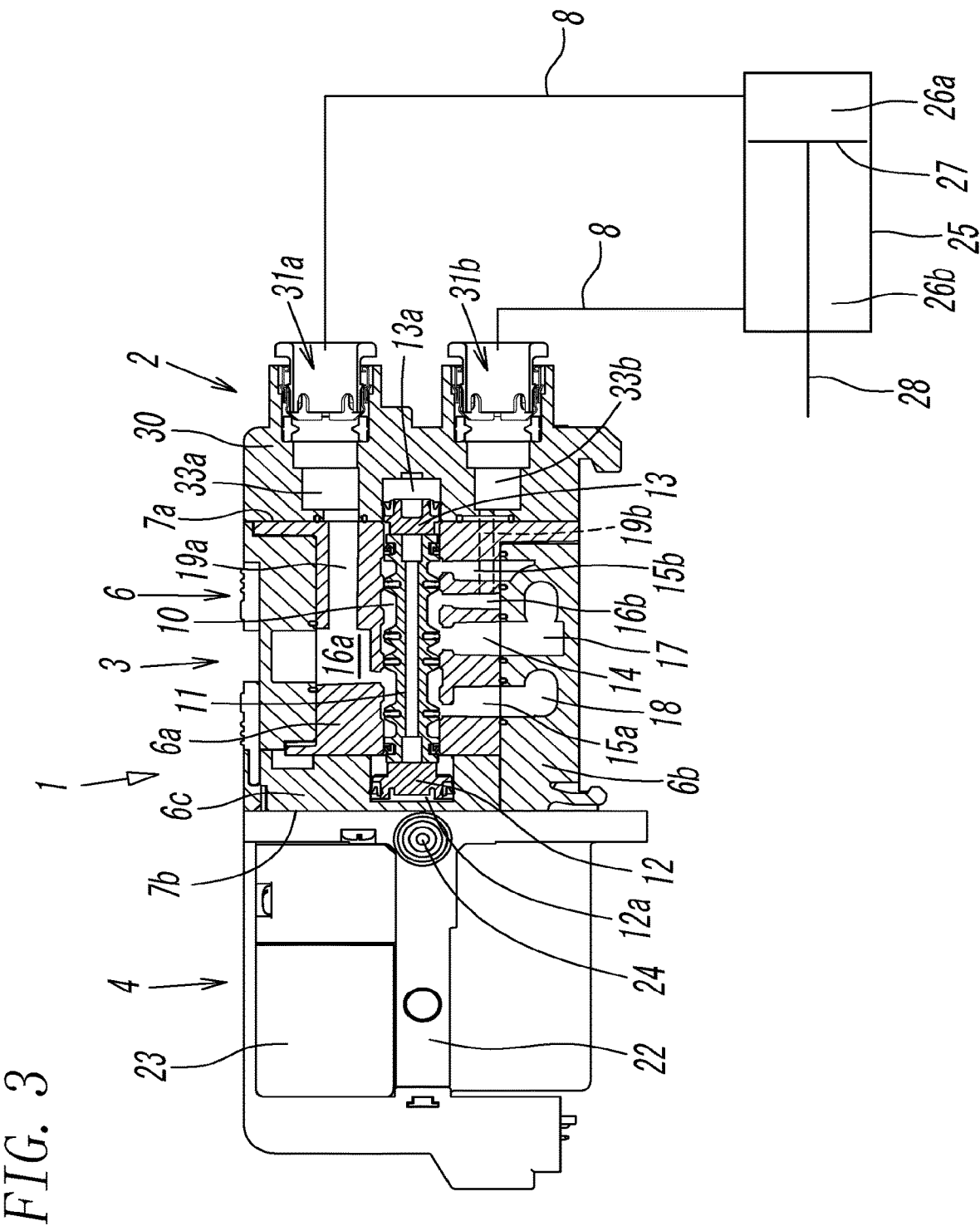
FIG. 3 is a sectional view of essential part of the solenoid valve in FIG. 1.

FIGS. 1 to 3 illustrate a solenoid valve 1, which is an example of a hydraulic device with a pipe joint 2 according to the present invention attached thereto. The solenoid valve 1 includes a main valve section 3 including a valve mechanism that switches between fluid passages and a solenoid operation section 4 that drives the valve mechanism. As illustrated in FIG. 2, another solenoid valve 1A having the same structure as that of the solenoid valve 1 can be sequentially connected directly to the solenoid valve 1 in side-by-side relationship such that the valves assembled together are used. Since such a structure of the solenoid valve 1 is known (refer to, for example, Japanese Unexamined Patent Application Publication No. 2005-308122), the essential components and operation of the valve will be described in brief herein. In the present embodiment, a fluid to be used is air.

As is apparent from FIG. 3, the main valve section 3 of the solenoid valve 1 includes a rectangular cuboid valve body 6 having therein the valve mechanism. The valve body 6 includes a first block 6a having therein the above-described valve mechanism, a second block 6b that functions as a manifold, and a third block 6c that also serves as a piston box such that these blocks are combined together. The valve body 6 has a longitudinally elongated rectangular shape when viewed from the front or the side where a first end 7a of the valve body 6 is located. The valve body 6 has right and left sides 6d, which are substantially flat faces.

The first block 6a has therein a valve hole 10 extending from the first end 7a toward a second end 7b opposite the first end 7a. The valve hole 10 slidably receives a spool 11. A large-diameter first piston 12 and a small-diameter second piston 13, which receive pilot air to move the spool 11, are located at first and second ends of the spool 11, respectively.

Furthermore, the valve hole 10 communicates with a single supply hole 14, a first discharge hole 15a, a second discharge hole 15b, a first output hole 16a, and a second output hole 16b. The supply hole 14 communicates with a supply port 17 located in the second block 6b. The first discharge hole 15a and the second discharge hole 15b communicate with a discharge port 18 located in the second block 6b. The first output hole 16a and the second output hole 16b respectively communicate with a first output port 19a and a second output port 19b, which open into the first end 7a of the first block 6a or the valve body 6. Therefore, the first end 7a is a port formation surface of the valve body 6. The pipe joint 2, which is of a quick connection type, is attached to the port formation surface 7a.

The solenoid operation section 4 includes a pilot body 22 connected to the second end 7b of the valve body 6, a three-port pilot solenoid valve 23 attached to the pilot body 22, and a pilot supply port 24 located in the pilot body 22. The pilot supply port 24 communicates with a first piston chamber 12a at the rear of the first piston 12 via the pilot solenoid valve 23, and also communicates with a second piston chamber 13a at the rear of the second piston 13 via a pilot passage (not illustrated) at all times.

While the pilot solenoid valve 23 is not energized, the first piston chamber 12a is open to atmosphere via the pilot solenoid valve 23. Thus, the spool 11 pressed by the second piston 13 occupies a first switching position as illustrated in FIG. 3, the supply hole 14 communicates with the second output hole 16b, the first output hole 16a communicates with the first discharge hole 15a, air from the supply port 17 is output from the second output port 19b to a rod-side pressure chamber 26b of an air cylinder 25 through a synthetic resin tube 8 connected to the pipe joint 2, and air discharged from a head-side pressure chamber 26a of the air cylinder 25 flows into the first output port 19a through another tube 8 and the pipe joint 2 and is then discharged from the discharge port 18 through the first output hole 16a and the first discharge hole 15a. Thus, a piston 27 and a rod 28 of the air cylinder 25 occupy a retracted position.

When the pilot solenoid valve 23 is energized, pilot air is supplied to the first piston chamber 12a via the pilot solenoid valve 23. Thus, the spool 11 is pressed by the large-diameter first piston 12 and occupies a second switching position opposite to the position illustrated in FIG. 3, the supply hole 14 communicates with the first output hole 16a, the second output hole 16b communicates with the second discharge hole 15b, air form the supply port 17 is output to the head-side pressure chamber 26a of the air cylinder 25 through the first output port 19a, and air discharged from the rod-side pressure chamber 26b of the air cylinder 25 flows through the second output port 19b, the second output hole 16b, and the second discharge hole 15b and is then discharged from the discharge port 18. Thus, the piston 27 and the rod 28 of the air cylinder 25 move forward.

The pipe joint 2 will now be described. As is apparent from FIGS. 4 and 5, the pipe joint 2 includes a joint body 30 made of synthetic resin. Like the valve body 6 of the solenoid valve 1, the joint body 30 has a longitudinally elongated rectangular shape when viewed from the front, or the side where its front surface having tube connection holes 31a and 31b is located. The joint body 30 has right and left sides 30a, which are flat faces. The joint body 30 has a width W1 (refer to FIG. 2), which is substantially equal to the width, W2, of the valve body 6. For example, poly(butylene terephthalate) (PBT) is suitably used as synthetic resin forming the joint body 30.

The joint body 30 includes, on its front surface, two cylindrical portions 32a and 32b arranged vertically. The cylindrical portions 32a and 32b have therein the tube connection holes 31a and 31b, respectively. The first tube connection hole 31a in the upper first cylindrical portion 32a communicates with the first output port 19a of the valve body 6 through a passage hole 33a. The second tube connection hole 31b in the lower second cylindrical portion 32b communicates with the second output port 19b of the valve body 6 through a passage hole 33b. Each of the tube connection holes 31a and 31b receives a plurality of joint parts and a packing 34. The joint parts include a retaining ring 35 to retain an outer circumferential surface of the tube 8 placed in the tube connection hole 31a or 31b, a release member 36 that can be pressed in order to release the retaining ring 35 to stop retaining, and a joint guide 37 that guides the release member 36. The packing 34 seals between an inner circumferential surface of the tube connection hole 31 and the outer circumferential surface of the tube 8.

The first tube connection hole 31a and the second tube connection hole 31b have the same structure including the joint parts and the packing 34 received therein, and the first cylindrical portion 32a and the second cylindrical portion 32b have substantially the same form. In the following description, therefore, the first tube connection hole 31a and the second tube connection hole 31b will be collectively referred to as "tube connection holes 31" if they do not have to be distinguished from each other, and the first cylindrical portion 32a and the second cylindrical portion 32b will also be collectively referred to as "cylindrical portions 32" if they do not have to be distinguished from each other. The same applies to the passage holes 33a and 33b.

Figure 5:
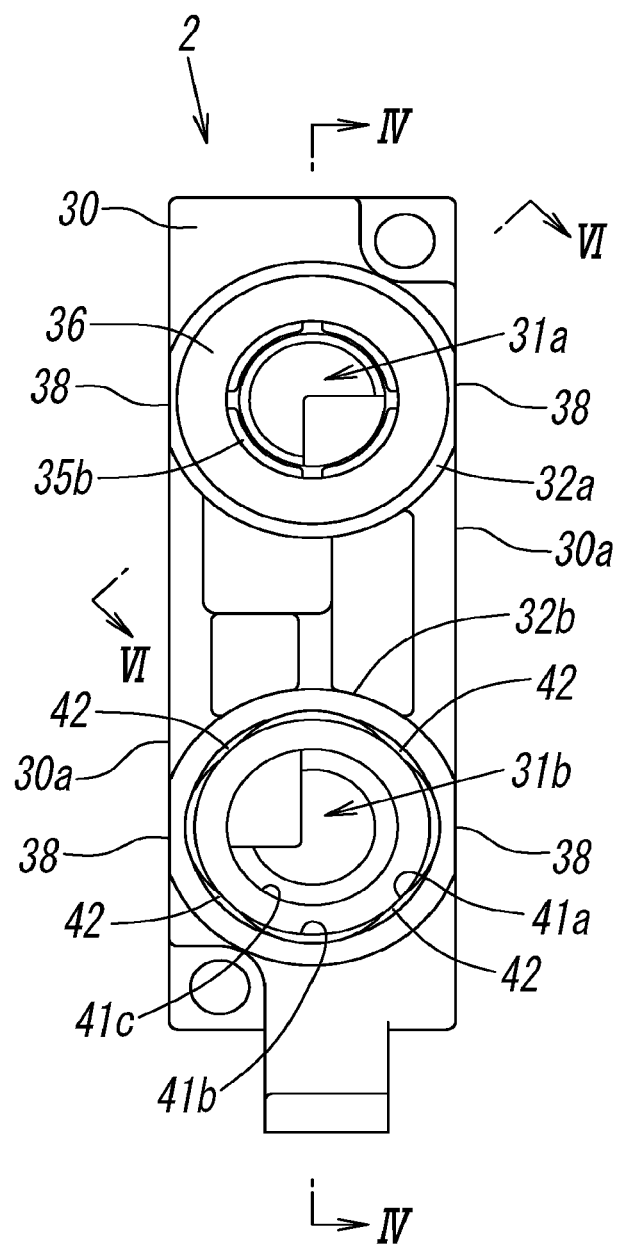
FIG. 5 is a front view of the pipe joint in FIG. 4.

The cylindrical portions 32 of the joint body 30 have an outside diameter slightly greater than the width W1 of the joint body 30. To prevent the cylindrical portions 32 from coming into contact with each other when the multiple solenoid valves 1 and 1A are connected to each other as illustrated in FIG. 2, flattened parts 38 providing flat faces are arranged on diametrically opposite sides of each of the cylindrical portions 32, or the opposite sides facing in the direction along the width W1 of the joint body 30, such that the opposite sides are flush with the sides of the joint body 30, as illustrated in FIGS. 1 and 5.

Figure 4:
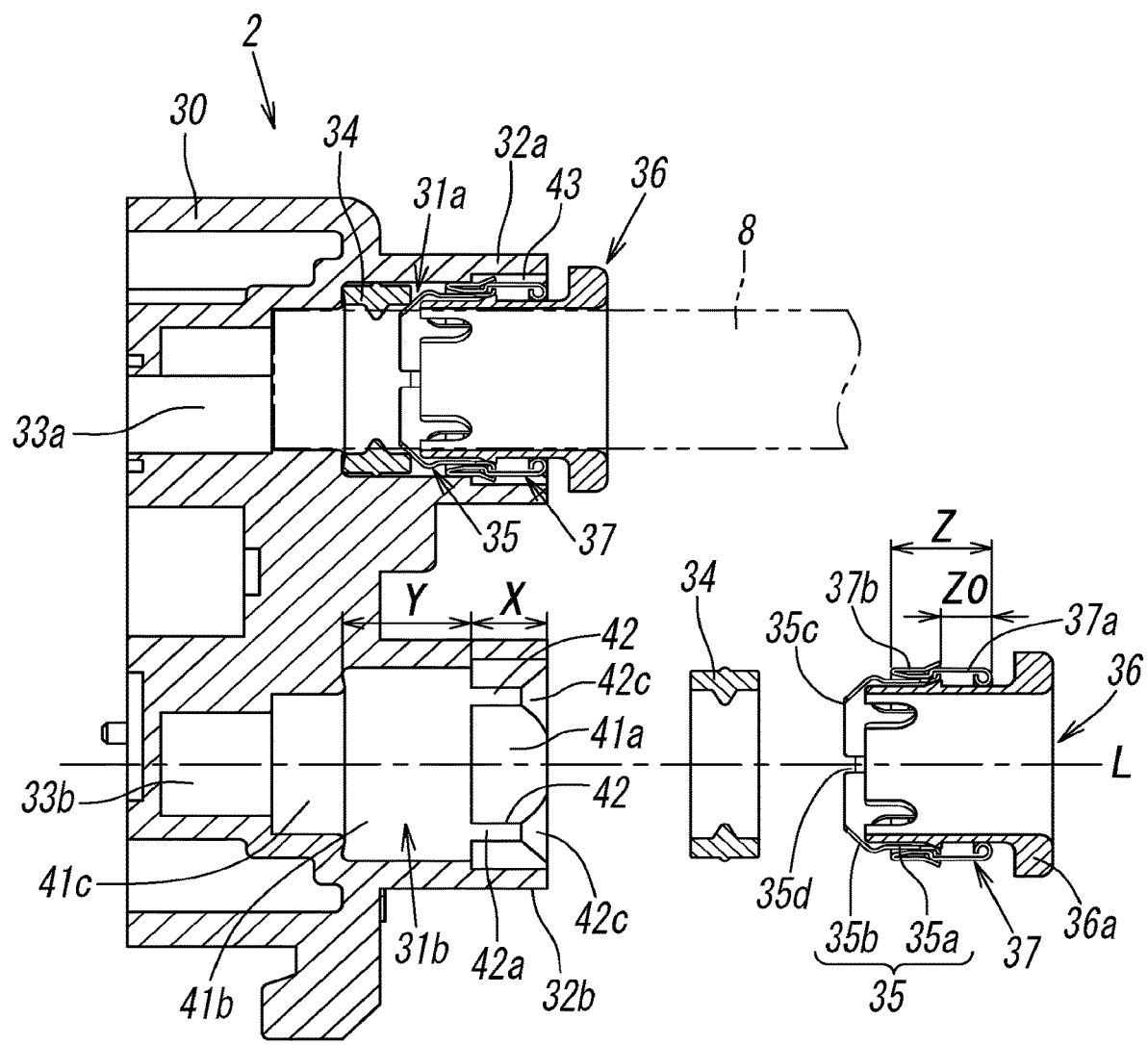
FIG. 4 is a sectional view of the pipe joint in FIG. 5 taken along line Iv-Iv and illustrates joint parts and a packing taken out of one of tube connection holes.
Figure 6:
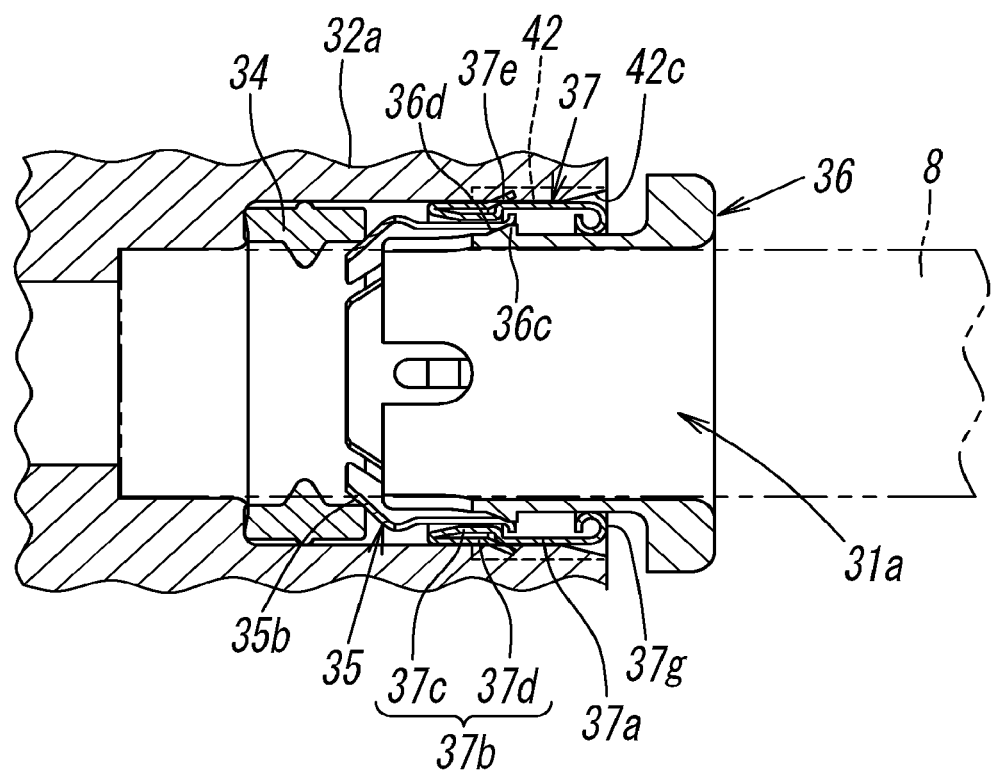
FIG. 6 is a sectional view of part of the pipe joint in FIG. 5 taken along line VI-VI.
Figure 7:
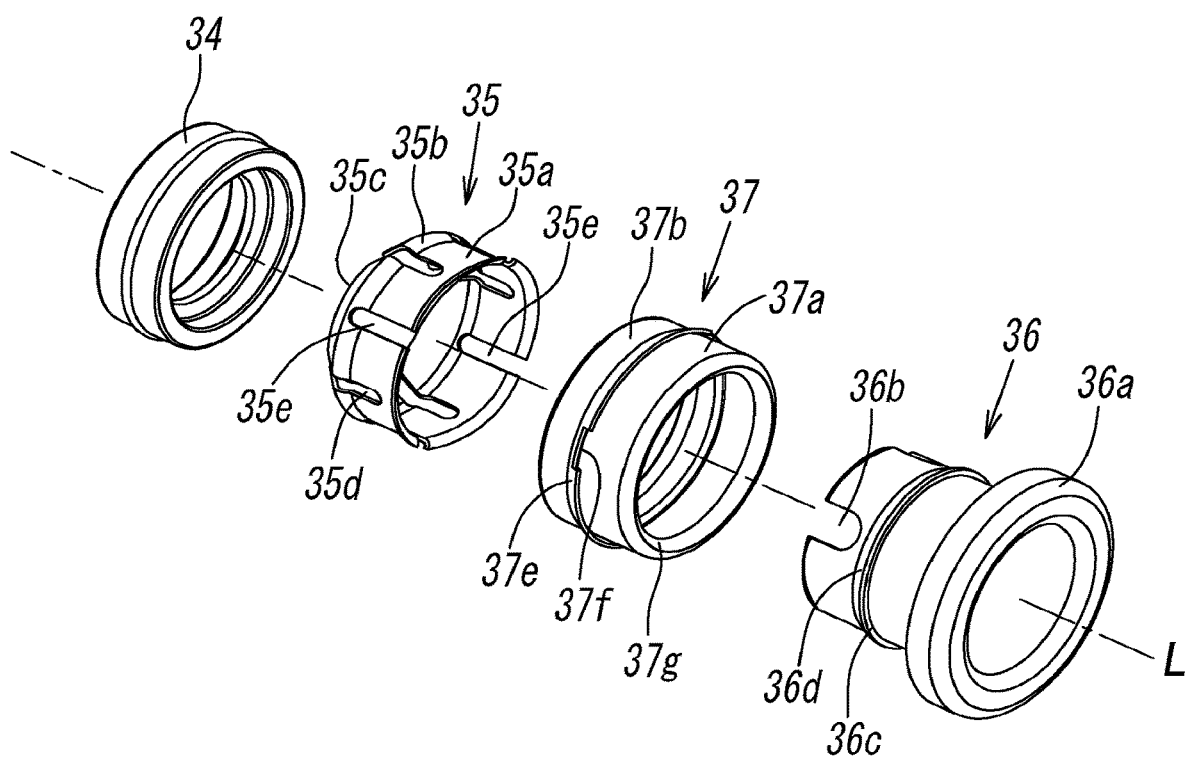
FIG. 7 is an exploded perspective view of the joint parts and the packing to be received in the tube connection hole.
Figure 8:
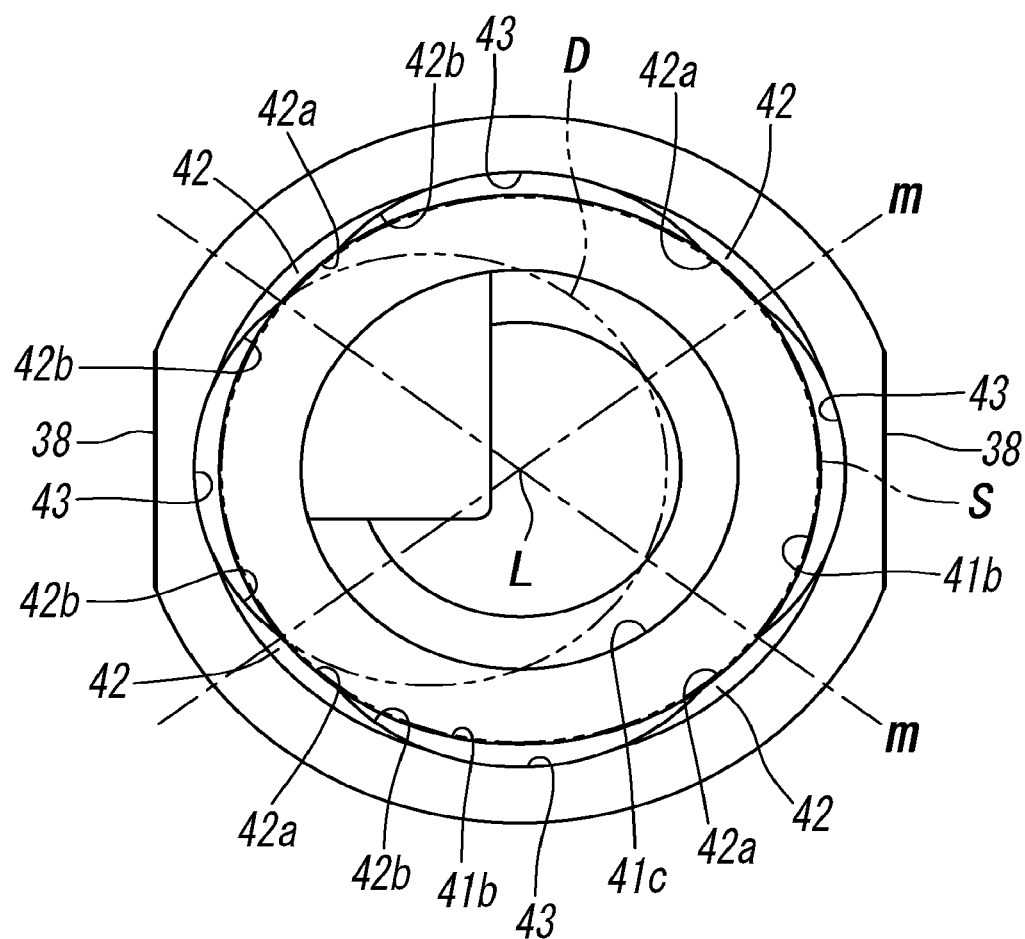
FIG. 8 is an enlarged front view of the lower tube connection hole in FIG. 5.

As is apparent from FIGS. 4, 6, and 7, the retaining ring 35, which is a hollow cylinder formed by stamping a thin metal plate made of stainless steel, includes cylindrical part 35a adjacent to a proximal end of the retaining ring 35 and retaining part 35b adjacent to a distal end thereof. The retaining part 35b is tapered toward the distal end to gradually decrease in diameter, and has at the distal end an edge 35c to retain the outer circumferential surface of the tube 8. The retaining ring 35 has a plurality of first slits 35d extending along the axis, L, of the tube connection hole 31 and arranged at regular intervals such that the first slits 35d extend from the distal end of the retaining part 35b to a position adjacent to the proximal end of the cylindrical part 35a, and further has a plurality of second slits 35e arranged at regular intervals such that each second slit 35e is located between the adjacent first slits 35d and extends from the proximal end of the cylindrical part 35a to a position close to the retaining part 35b.

The release member 36, which is a cylindrical member made of synthetic resin, is disposed such that a distal end of the release member 36 is located close to an inner surface of the retaining part 35b of the retaining ring 35 and a proximal end of the release member 36 protrudes out of the tube connection hole 31, and includes at the proximal end a flange 36a extending radially outward. The flange 36a has an outside diameter greater than an inside diameter of the tube connection hole 31 and less than the outside diameter of the cylindrical portion 32. The release member 36 has a plurality of slits 36b located adjacent to the distal end of the release member 36 and arranged at regular intervals. The release member 36 includes on its outer circumferential surface an annular protrusion 36c having a continuously circular sloping face 36d as a front face.

As illustrated in FIG. 6, while the release member 36 is not pressed into the tube connection hole 31, the sloping face 36d of the annular protrusion 36c is retained by and located at the proximal end of the retaining ring 35. When the flange 36a is pressed into the tube connection hole 31 with a finger, the annular protrusion 36c is slid on an inner circumferential surface of the retaining ring 35 and the distal end of the release member 36 expands the retaining part 35b away from the tube 8. In such a state, the tube 8 can be removed from the pipe joint 2.

The joint guide 37 restricts movement of the retaining ring 35 along the axis L and also guides the release member 36 moving along the axis L. The joint guide 37 is a hollow cylinder formed by stamping a metal plate made of, for example, stainless steel, and is press-fitted and fixed in the tube connection hole 31. More specifically, the joint guide 37 includes guide main body part 37a located at a proximal end of the joint guide 37 and having a single cylinder structure (single-walled structure) and guide distal end part 37b having a double-cylinder structure (double-walled structure). The guide distal end part 37b includes inner cylindrical part 37c continuously extending from the guide main body part 37a and outer cylindrical part 37d formed by folding a distal end portion of the inner cylindrical part 37c on an outer surface of the inner cylindrical part 37c. The outer cylindrical part 37d includes at its end an annular barb 37e (catch) obliquely raised toward the proximal end of the joint guide 37. The barb 37e digs into or catches inner wall surfaces 42a of contact walls 42 located in the tube connection hole 31.

The barb 37e is divided into a plurality of arc-shaped segments by a plurality of cuts 37f spaced at regular intervals. With such a configuration, the barb 37e can be readily elastically deformed such that the barb 37e decreases in diameter when the joint guide 37 is press-fitted into the tube connection hole 31. This facilitates press-fitting of the joint guide 37.

The inner cylindrical part 37c of the guide distal end part 37b has an inside diameter less than that of the guide main body part 37a. The outer cylindrical part 37d has an outside diameter substantially equal to that of the guide main body part 37a. The guide main body part 37a includes at its proximal end an annular guiding portion 37g whose end is inwardly turned and curved so as to have a substantially circular cross-sectional shape. The annular guiding portion 37g is to touch the outer circumferential surface of the release member 36. When pressed, the release member 36 is guided by the annular guiding portion 37g.

The tube connection holes 31 will now be described. As is apparent from FIGS. 4 to 6 and 8, each tube connection hole 31 includes a noncircular first hole portion 41*a* in which the joint guide 37 is press-fitted, a circular second hole portion 41*b* receiving the packing 34, and a circular third hole portion 41*c* arranged in that order in a direction from an inlet of the hole to the passage hole 33. The third hole portion 41*c* has a diameter less than that of the second hole portion 41*b* and is sized such that a distal end of the tube 8 is substantially fitted therein.

The first hole portion 41*a* has a length (depth) X along the axis L that is less than the length (depth), Y, along the axis L of the second hole portion 41*b*. Furthermore, the length X is slightly less than the length, Z, of the joint guide 37 but is greater than a distance Zo from the proximal end of the joint guide 37 to the barb 37*e*.

The first hole portion 41*a* has an inner circumferential surface including the contact walls 42 protruding toward the axis of the tube connection hole 31 such that the contact walls 42 extending along the axis L are equiangularly spaced about the axis L of the tube connection hole 31. The inner wall surfaces 42*a* of the contact walls 42 are in contact with the outer circumferential surface of the joint guide 37. In an illustrated example, four contact walls 42 are spaced at 90-degree intervals. Each of the flattened parts 38 of the sides of the cylindrical portion 32 is disposed between the inner wall surfaces 42*a* of the two adjacent contact walls 42. More specifically, the flattened part 38 is located between two planes m that connect ends (adjacent ends) of the inner wall surfaces 42*a* of the two adjacent contact walls 42 to the axis L of the tube connection hole 31.

The inner wall surface 42*a* of each contact wall 42 is a concave surface curved outwardly in a radial direction of the tube connection hole 31. The concave surface forms part of an imaginary cylindrical surface S coaxial with the tube connection hole 31. In the illustrated example, the imaginary cylindrical surface S has the same diameter as that of the second hole portion 41*b*. Accordingly, the concave surface has the same radius of curvature as that of the second hole portion 41*b*. Thus, the inner wall surface 42*a* of the contact wall 42 smoothly connects to an inner circumferential surface of the second hole portion 41*b* with no shoulder.

Furthermore, the diameter of the imaginary cylindrical surface S is the same as or slightly greater than the outside diameter of the guide main body part 37*a* of the joint guide 37 and is less than the diameter of the barb 37*e*.

For the shape of a cross-section of each contact wall 42 orthogonal to the axis L, the cross-section gradually increases in width in a direction from the inner wall surface 42*a* to a proximal end of the contact wall 42. Side wall surfaces 42*b* on the right and left of the contact wall 42 are concavely curved.

Furthermore, a recess 43 curved to correspond to part of a cylindrical surface is provided between the adjacent contact walls 42. The recess 43 partially defines the side wall surfaces 42*b* of the contact walls 42. The recess 43 has a radius of curvature less than that of the tube connection hole 31, or the second hole portion 41*b*. The recess 43 is deepest at the midpoint between the adjacent contact walls 42, at which the barb 37*e* of the joint guide 37 is not in contact with the recess 43. In other words, a circle circumscribing deepest parts of all of the recesses 43 has a diameter greater than an outside diameter of the barb 37*e*. Therefore, each of the recesses 43 serves as a relief that keeps the barb 37*e* from catching a portion other than the contact walls 42.

Each contact wall 42 further has an end wall surface 42*c* facing the inlet of the tube connection hole 31. The end wall surface 42*c* gradually slopes up to the inner wall surface 42*a* toward the back of the tube connection hole 31, or the second hole portion 41*b*.

For example, the contact walls 42 can be formed in the following manner. The first hole portion 41*a* is formed as a circular hole that coincides with the imaginary cylindrical surface S. Then, a drill D is used to cut an inner circumferential surface of the hole such that four recesses 43 are spaced at 90-degree intervals. Thus, each of the contact walls 42 can be formed between the adjacent recesses 43.

When the joint guide 37 is press-fitted into the tube connection hole 31, which is formed in the above-described manner, the sloping end wall surfaces 42*c* of the contact walls 42 guide the joint guide 37 to a position at which the joint guide 37 is coaxial with the tube connection hole 31. After that, the joint guide 37 is pressed into the first hole portion 41*a* of the tube connection hole 31. At this time, the outer circumferential surface of the joint guide 37, particularly the barb 37*e*, is brought into tight contact with the inner wall surfaces 42*a* of the contact walls 42. Accordingly, the barb 37*e* is elastically deformed to decrease in diameter, whereas the contact walls 42 are compressed by the barb 37*e* in a direction in which the diameter of the imaginary cylindrical surface S increases. As a result, while being guided by the inner wall surfaces 42*a*, the joint guide 37 is pressed to a position at which the proximal end of the annular guiding portion 37*g* coincides with an inlet end of the tube connection hole 31. At this position, the barb 37*e* catches the inner wall surfaces 42*a* of the respective contact walls 42 and is thus fixed. In such a state, the guide distal end part 37*b* is partly located in the second hole portion 41*b*.

For convenience of understanding, FIG. 6 illustrates in an exaggerated manner the barb 37*e* digging into and catching the inner wall surfaces 42*a* of the contact walls 42. Actually, the extent to which the barb 37*e* digs into the inner wall surfaces 42*a* of the contact walls 42 is less than illustrated.

Since the outer circumferential surface of the joint guide 37 is in contact with the multiple contact walls 42, the joint guide 37 is press-fitted into the tube connection hole 31 while being in partial contact with the inner circumferential surface of the tube connection hole 31. Therefore, a resistance to press-fitting in this case is significantly less than that in the case where the joint guide 37 with its entire outer circumferential surface in contact with the inner circumferential surface of the tube connection hole 31 is press-fitted into the tube connection hole 31. This facilitates smooth press-fitting of the joint guide 37.

In addition, since the inner wall surfaces 42*a*, which are concave, of the contact walls 42 are in intimate contact with the outer circumferential surface of the joint guide 37, the contact walls 42 stably support the joint guide 37 at all times during and after press-fitting.

Furthermore, while the joint guide 37 is being press-fitted, the cylindrical portion 32 of the joint body 30, which is made of synthetic resin, experiences a force acting in a direction in which the diameter of the cylindrical portion 32 can increase. This force is absorbed mainly by compression of the contact walls 42. A compression force, produced by the contact walls 42, acting on the joint guide 37 inwardly (toward the axis L) is absorbed by slight outward elastic deformation of the joint guide 37 at the recesses 43. Such a synergy between these force absorption effects reduces the force acting on the joint body 30. Thus, the cylindrical portion 32 is less prone to overall deformation. If the cylindrical portion 32 is slightly deformed, deformed part can include the contact walls 42 and their surroundings. The entire cylindrical portion 32 is unlikely to be deformed significantly and uniformly. Therefore, if the joint body 30 is made of glass-fiber-containing synthetic resin, which is rigid and susceptible to stretching, the joint guide 37 can be press-fitted into the tube connection hole 31 while the cylindrical portion 32 is being kept from cracking due to an increase in overall diameter of the cylindrical portion 32.

If the joint guide 37 is elastically deformed at the recesses 43, each of which serves as a relief as described above, the deformation will not interfere with attachment/detachment of the tube 8 because the amount of deformation is very small.

Even in a case where each of the flattened parts 38 of the sides of each cylindrical portion 32 results in a reduction in thickness of the cylindrical portions 32 at this part as in the above-described first embodiment, the flattened part 38 located between the adjacent contact walls 42 avoids deformation of the cylindrical portion 32 at the flattened part 38, thus preventing cracking of the cylindrical portion 32.

If the outside diameter of the cylindrical portion 32 is equal to or less than the width of the joint body, the flattened parts 38 do not have to be provided.

In the pipe joint 2 according to the above-described first embodiment, each tube connection hole 31 has therein the four contact walls 42. The number of contact walls 42 may be two, three, or five or more.

Figure 9:
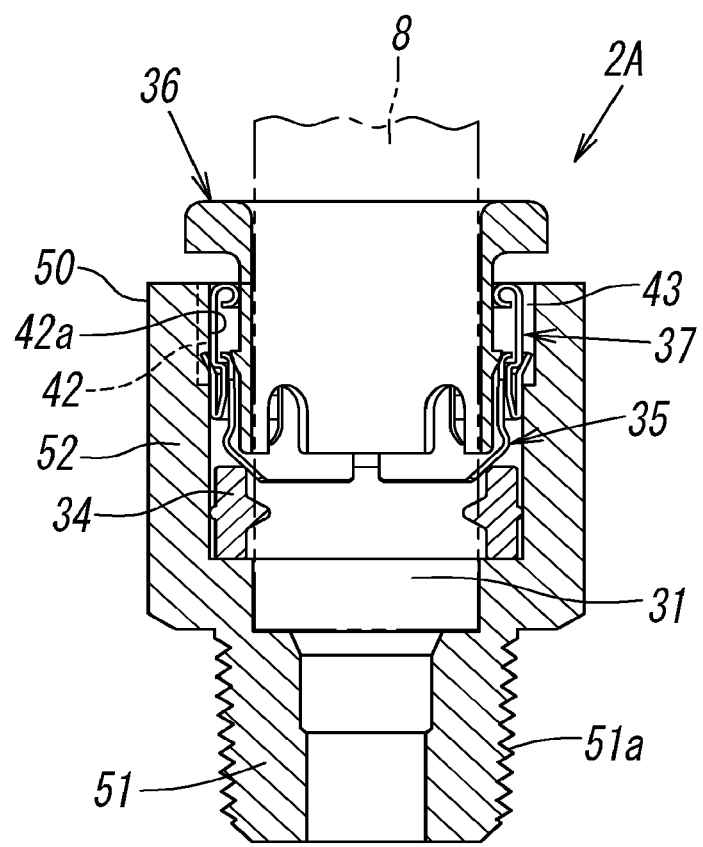
FIG. 9 is a sectional view of a pipe joint according to a second embodiment.

Although the pipe joint 2 according to the above-described first embodiment includes the joint body 30 having the two tube connection holes 31, the present invention is applicable to a pipe joint including a joint body 50 having a single tube connection hole 31 like a pipe joint 2A according to a second embodiment illustrated in FIG. 9.

The pipe joint 2A according to the second embodiment is of a type that is used in direct connection with a port of a hydraulic device. The joint body 50 includes an attaching portion 51 having on its outer circumferential surface a male thread 51a to be screwed into a threaded hole of the port and a cylindrical portion 52 having a tube connection hole 31. The tube connection hole 31 is formed similarly to the tube connection hole 31 in the above-described first embodiment. The tube connection hole 31 receives joint parts and a packing 34 similar to those in the pipe joint 2 according to the first embodiment. In the pipe joint 2A according to the second embodiment, therefore, the same components and parts as those in the pipe joint 2 according to the first embodiment are designated by the same reference signs and a description of the components and parts is omitted.

In the pipe joint 2 according to the first embodiment and the pipe joint 2A according to the second embodiment, the inner wall surface 42a of each contact wall 42 is concave. The inner wall surface 42a may be a flat surface that touches the imaginary cylindrical surface S.

Figure 10:
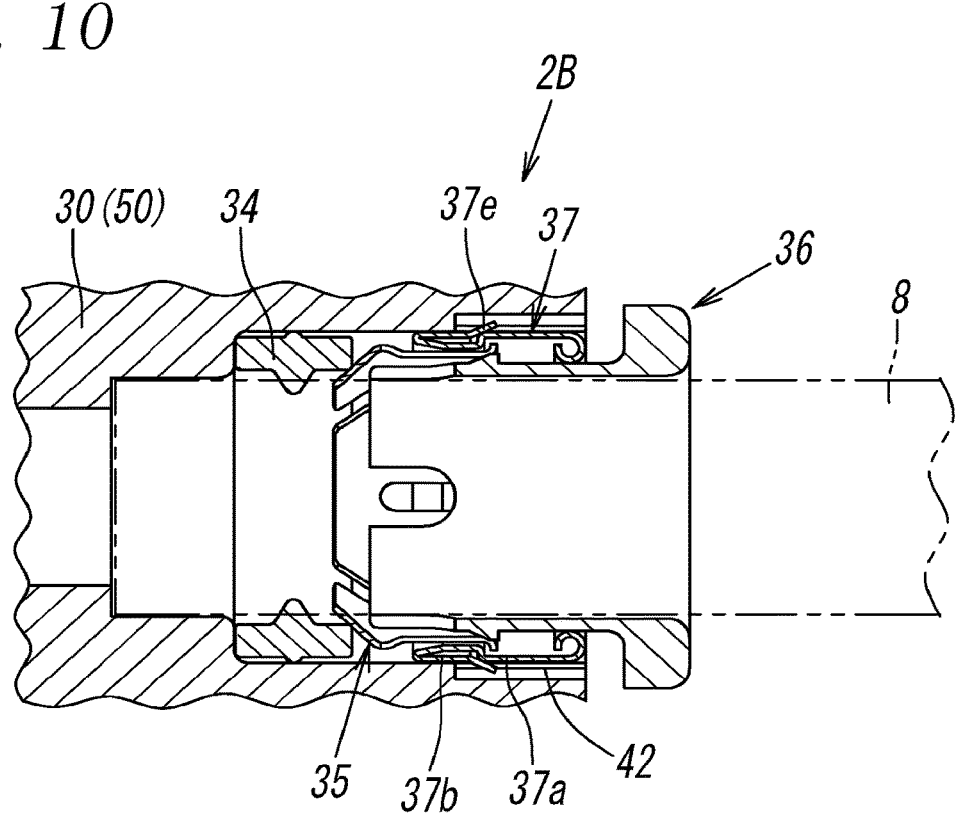
FIG. 10 is a sectional view of essential part of a pipe joint according to a third embodiment.
Figure 11:
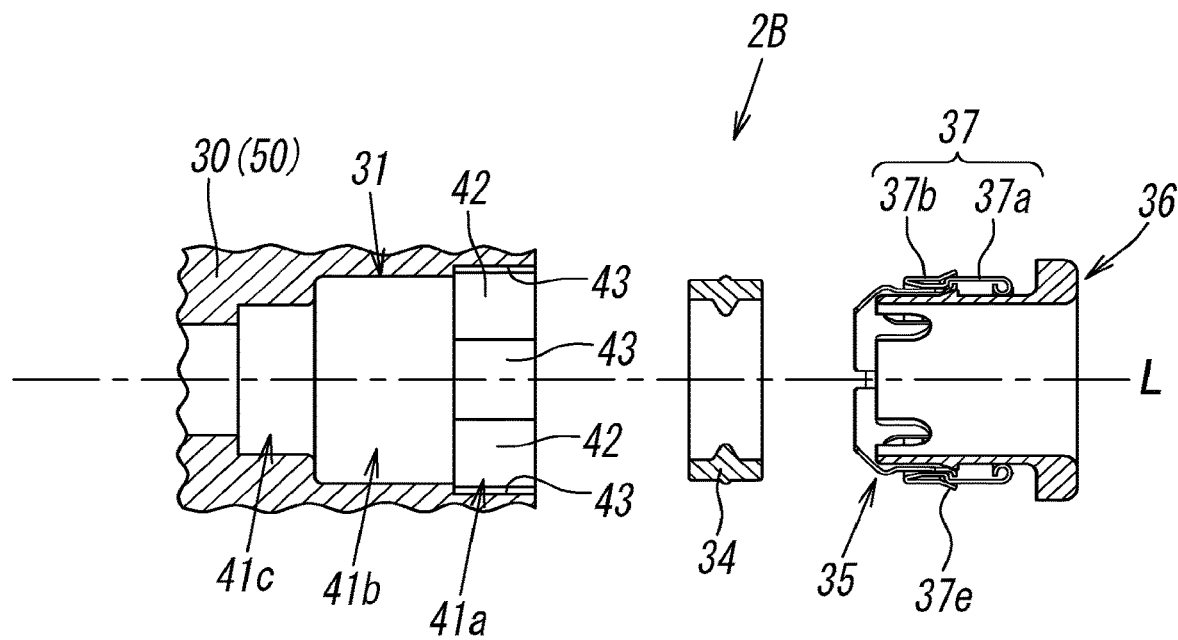
FIG. 11 is an exploded view of FIG. 10.
Figure 12:
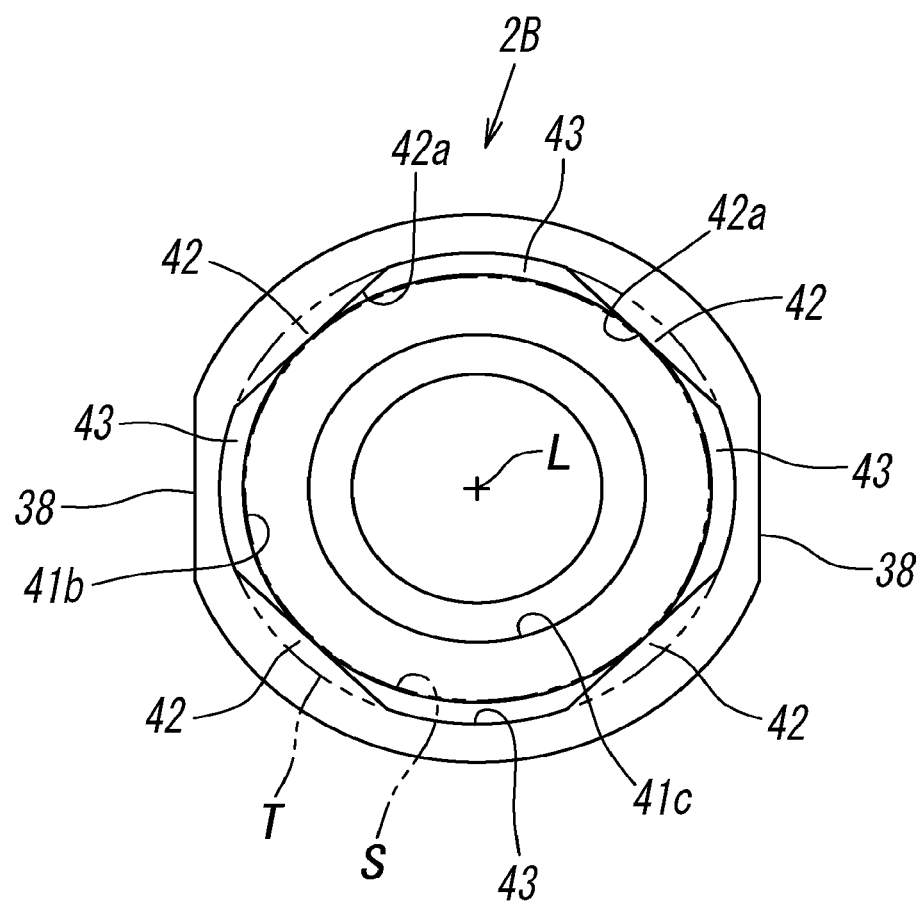
FIG. 12 is an enlarged front view of a tube connection hole in FIG. 11.

FIGS. 10 to 12 illustrates, as a third embodiment, another pipe joint in which the inner wall surface 42a of each contact wall 42 is a flat surface. A pipe joint 2B according to the third embodiment differs from the pipe joint 2 or 2A according to the first or second embodiment in only the form of the tube connection hole 31, particularly the first hole portion 41a. The rest of the configuration of the pipe joint 2B is substantially the same as that of the pipe joint 2 or 2A according to the first or second embodiment. Accordingly, the following description will focus on the form of the first hole portion 41a. For the rest of the configuration, the same components and parts as those in the first or second embodiment are designated by the same reference signs and a description of these components and parts is omitted.

In the pipe joint 2B, a tube connection hole 31 includes a noncircular first hole portion 41a, a circular second hole portion 41b, and a circular third hole portion 41c. The first hole portion 41a has four contact walls 42 spaced at 90-degree intervals about the axis L and arcuate curved recesses 43, each of which is located between the adjacent contact walls 42.

Each contact wall 42 has an inner wall surface 42a, which is a flat surface that touches the imaginary cylindrical surface S having the same diameter as that of the second hole portion 41b. The inner wall surface 42a linearly connects one end of the recess 43 located on a first side of the contact wall 42 and one end of the recess 43 located on a second side of the contact wall 42. In other words, the inner wall surface 42a is a single flat surface extending across the width of the contact wall 42.

The recess 43 corresponds to part of a cylindrical surface and forms part of an imaginary cylindrical surface T located coaxial with the imaginary cylindrical surface S and having a greater diameter than the imaginary cylindrical surface S.

In the pipe joint 2B according to the third embodiment, a joint guide 37 is press-fitted into the tube connection hole 31 in a manner similar to that in the pipe joints 2 and 2A according to the first and second embodiments. At this time, the inner wall surface 42a of each contact wall 42 is in contact with the joint guide 37 at a position where the inner wall surface 42a touches the imaginary cylindrical surface S, or at the middle of the width of the inner wall surface 42a.

The inner wall surface 42a of each contact wall 42 does not necessarily have to extend across the width of the contact wall 42. It is only required that the inner wall surface 42a is formed as a portion of the contact wall 42 that is to be in contact with the joint guide 37. In this case, each portion (portion corresponding to the side wall surface 42b in FIG. 8) connecting a side edge of the inner wall surface 42a formed as the above-described portion to a side edge of the recess 43 may be linearly inclined relative to the inner wall surface 42a.

Furthermore, the contact wall 42 may have a sloping end wall surface, like the end wall surface 42c of the contact wall 42 in the pipe joint 2 according to the first embodiment, such that the end wall surface gradually slopes to the inner wall surface 42a toward the back of the tube connection hole 31.

The present invention is also applicable to a pipe joint (not illustrated) for connection of tubes, namely, a pipe joint including a joint body having tube connection holes at opposite ends.

REFERENCE SIGNS LIST 1 solenoid valve
2, 2A, 2B pipe joint
3 main valve section
4 solenoid operation section
6 valve body
7a port formation surface
8 tube
30, 50 joint body
31, 31a, 31b tube connection hole
32a, 32b, 52 cylindrical portion
34 packing
35 retaining ring
36 release member
37 joint guide
37e barb
38 flattened part
41a first hole portion
41b second hole portion
42 contact wall 42*a* inner wall surface
42*b* side wall surface
42*c* end wall surface
43 recess
S imaginary cylindrical surface
L axis
W1 width of joint body
W2 width of valve body
X length of first hole portion
Z length of joint guide
Zo distance from proximal end of joint guide to barb

The invention claimed is:

1. A pipe joint including a joint body having a tube connection hole receiving a retaining ring that is to retain an outer circumferential surface of a tube placed in the tube connection hole, a cylindrical release member that is to release the retaining ring to stop retaining, a cylindrical metal joint guide that guides the release member, and a packing that is to seal between an inner circumferential surface of the tube connection hole and the outer circumferential surface of the tube, wherein the joint guide includes on an outer circumferential surface thereof a barb that prevents disconnection, and is press-fitted in the tube connection hole, and wherein the inner circumferential surface of a portion of the tube connection hole that holds the press-fitted barb of the joint guide includes a plurality of contact walls each having an inner wall surface in contact with the outer circumferential surface of the joint guide, the contact walls are equiangularly spaced about an axis of the tube connection hole and extend along the axis, and the barb catches the contact walls.

2. The pipe joint according to claim 1, wherein the tube connection hole includes a noncircular first hole portion having the contact walls and a circular second hole portion continuously extending from the first hole portion, wherein the first hole portion has a length along the axis that is less than that of the joint guide and that is greater than a distance from a proximal end of the joint guide to the barb, wherein the joint guide is press-fitted in the tube connection hole such that a distal end of the joint guide is fitted in the second hole portion and the barb is fitted in the first hole portion, and wherein the packing is received in the second hole portion.

3. The pipe joint according to claim 2, wherein an imaginary cylindrical surface located inside and in contact with each of the contact walls has a diameter equal to that of the second hole portion.

4. The pipe joint according to claim 3, wherein the inner wall surfaces of the contact walls are flat surfaces that touch the imaginary cylindrical surface.

5. The pipe joint according to claim 3, wherein the inner wall surfaces of the contact walls are concave surfaces that correspond to parts of the imaginary cylindrical surface.

6. The pipe joint according to claim 1, wherein a recess is provided between the contact walls that are adjacent, and the recess serves as a relief that keeps the barb from catching a portion other than the contact walls and also serves as a relief that allows the joint guide to be deformed at a portion other than the inner wall surfaces when experiencing a force applied by the contact walls.

7. The pipe joint according to claim 1, wherein the contact walls are four contact walls spaced at 90-degree intervals.

8. The pipe joint according to claim 1, wherein the joint body includes a cylindrical portion having a diameter greater than a width of the joint body, and the cylindrical portion has therein the tube connection hole, and wherein the cylindrical portion has flattened parts located on diametrically opposite sides, the flattened parts provide flat faces such that the sides are flush with sides of the joint body, and each of the flattened parts is located between two adjacent contact walls.

9. A solenoid valve with the pipe joint according to claim 8, the solenoid valve comprising:

a main valve section including a valve mechanism that switches between passages; and a solenoid operation section that drives the valve mechanism, wherein the main valve section includes a rectangular cuboid valve body having therein the valve mechanism, the valve body has a width equal to that of the joint body, and the joint body is attached to a port formation surface of the valve body.

\* \* \* \* \*